(12) United States Patent
Kuroda

(10) Patent No.: US 11,203,178 B2
(45) Date of Patent: Dec. 21, 2021

(54) REINFORCED SUBSTRATE FOR COMPOSITE MATERIAL, COMPOSITE MATERIAL, AND METHOD FOR MANUFACTURING REINFORCED SUBSTRATE FOR COMPOSITE MATERIAL

(71) Applicant: Nissan Motor Co., Ltd., Yokohama (JP)

(72) Inventor: Shinichi Kuroda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/341,953

(22) PCT Filed: Nov. 1, 2016

(86) PCT No.: PCT/JP2016/082463
§ 371 (c)(1),
(2) Date: Apr. 15, 2019

(87) PCT Pub. No.: WO2018/083735
PCT Pub. Date: May 11, 2018

(65) Prior Publication Data
US 2019/0240954 A1     Aug. 8, 2019

(51) Int. Cl.
*B32B 5/12*     (2006.01)
*D04H 3/04*     (2012.01)
(Continued)

(52) U.S. Cl.
CPC ............... *B32B 5/12* (2013.01); *B29C 70/20* (2013.01); *B32B 5/06* (2013.01); *D04H 3/04* (2013.01)

(58) Field of Classification Search
CPC .. B32B 5/12; B32B 5/06; B29C 70/20; B29C 70/202; D04H 3/04
See application file for complete search history.

(56) References Cited

U.S. PATENT DOCUMENTS 6,277,771 B1 *  8/2001  Nishimura .............. B29C 70/22
                                                                442/229
2005/0070182 A1  3/2005  Dunn
(Continued)

FOREIGN PATENT DOCUMENTS

CN    1314842 A    9/2001
CN    1320415 A    11/2001
(Continued)

OTHER PUBLICATIONS

Czél, Gergely, and M. R. Wisnom. "Demonstration of pseudo-ductility in high performance glass/epoxy composites by hybridisation with thin-ply carbon prepreg." Composites Part A: Applied Science and Manufacturing 52 (2013): 23-30. (Year: 2013).*
(Continued)

*Primary Examiner* — Michael Zhang
(74) *Attorney, Agent, or Firm* — Global IP Counselors, LLP

(57) ABSTRACT

A reinforced substrate is used for molding a composite material. The reinforced substrate includes a first region and a second region. The first region includes reinforcing fibers extending in a fiber direction that is aligned in a single direction. The second region includes the reinforcing fibers aligned in the same direction as the fiber direction and being thinner than the first region. The first region and the second region are lined up in alternating fashion in a plane along a direction intersecting the fiber direction.

5 Claims, 14 Drawing Sheets

(51) Int. Cl.
    *B32B 5/06*          (2006.01)
    *B29C 70/20*       (2006.01)

(56) References Cited

U.S. PATENT DOCUMENTS

| | | | | |
|---|---|---|---|---|
| 2015/0125651 A1* | 5/2015 | Tsuchiya | .............. | D04B 21/165 |
| | | | | 428/102 |
| 2015/0375461 A1 | 12/2015 | Blackburn et al. | | |
| 2018/0093397 A1* | 4/2018 | Tsuji | .................... | B29B 15/105 |

FOREIGN PATENT DOCUMENTS

| | | |
|---|---|---|
| CN | 1821473 A | 8/2006 |
| JP | 2001-55642 A | 2/2001 |
| JP | 2008-132775 A | 6/2008 |
| JP | 2010-17934 A | 1/2010 |
| JP | 2010-156081 A | 7/2010 |
| JP | 5261171 B2 | 8/2013 |
| JP | 2015-145547 A | 8/2015 |
| JP | 2016-121424 A | 7/2016 |
| WO | 2012/076308 A1 | 6/2012 |
| WO | 2016/147646 A1 | 9/2016 |

OTHER PUBLICATIONS

Definition of laminate, "Merriam-Webster Dictionary," https://www.merriam-webster.com/dictionary/laminate (Year: 2020).*

* cited by examiner

REINFORCED SUBSTRATE FOR COMPOSITE MATERIAL, COMPOSITE MATERIAL, AND METHOD FOR MANUFACTURING REINFORCED SUBSTRATE FOR COMPOSITE MATERIAL

CROSS-REFERENCE TO RELATED APPLICATIONS

This application is a U.S. national stage application of International Application No. PCT/JP2016/082463, filed on Nov. 1, 2016.

BACKGROUND

Technical Field

The present invention relates to a reinforced substrate for a composite material, a composite material, and a method for manufacturing a reinforced substrate for a composite material.

Background Information

Composite materials obtained by impregnating a reinforced substrate with a resin in order to reduce a weight of a vehicle body for an automobile have been widely used in recent years as automobile components. An example of a method for manufacturing these composite materials is the method disclosed in Japanese Laid-Open Patent Application No. 2001-55642 (Patent Citation 1) noted below in which a dry substrate not impregnated with resin is used as a reinforced substrate. A dry substrate has lower manufacturing cost than a prepreg in which the reinforced substrate has been impregnated with a resin. Accordingly, a composite material can be manufactured at low cost by the use of a dry substrate as the reinforced substrate.

In the method disclosed in Patent Citation 1, a cloth substrate in which warps and wefts are woven to form a woven fabric is used as a dry substrate. In a cloth substrate, portions (crimps) having curved fibers are formed by the warps and wefts being knitted in intersecting fashion. Curved fibers are known to have lower strength than fibers extended in rectilinear fashion. Accordingly, a cloth substrate will be less strong than a substrate in which the fibers are aligned in a single direction. In order to solve this problem, Patent Japanese Laid-Open Patent Application No. 2015-145547 (Citation 2) and Japanese Laid-Open Patent Application No. 2008-132775 (Patent Citation 3), for example, disclose methods for manufacturing composite materials in which a non-crimp fabric (NCF) substrate is used, the NCF substrate having fibers aligned in a single direction without the formation of crimps.

Since no crimps are formed in an NCF substrate, the strength of the composite material can be increased over that of a cloth substrate. Also, since an NCF substrate does not require a step for weaving warps and wefts, productivity is higher and costs are lower than with a cloth substrate.

SUMMARY

A resin with which a reinforced substrate is impregnated shrinks when cured. Also, because a fiber direction in an NCF substrate is aligned in a single direction, the strength of the reinforced substrate in the fiber direction is higher than in a direction intersecting the fiber direction. For this reason, the reinforced substrate has higher resistance to resin shrinkage in the fiber direction than in the direction intersecting the fiber direction.

A shrinkage percentage of a composite material that accompanies resin shrinkage is lower in the fiber direction than in the direction intersecting the fiber direction. Warping may occur in the composite material depending on a difference in the shrinkage percentage of the composite material in the fiber direction and the direction intersecting the fiber direction.

Inasmuch, the present invention was contrived in order to solve the above-described problems, it being an object thereof to provide a reinforced substrate for a composite material, a composite material, and a method for manufacturing a reinforced substrate for a composite material in which warping of the composite material caused by resin shrinkage can be minimized.

A reinforced substrate for a composite material according to the present invention that achieves the aforementioned object is used for molding the composite material. The reinforced substrate for a composite material has a first region that includes reinforcing fibers extending in a fiber direction is aligned in a single direction, and a second region that includes the reinforcing fibers aligned in the same direction as the fiber direction and that is thinner than the first region. The first region and the second region are lined up in alternating fashion in a plane along a direction intersecting the fiber direction.

A composite material according to the present invention that achieves the aforementioned object is obtained by disposing a resin in the reinforced substrate. The composite material has a first region that includes reinforcing fibers in which a fiber direction is aligned in a single direction, a second region that includes the reinforcing fibers aligned in the same direction as the fiber direction and that is thinner than the first region, and a third region that is formed so as to overlap the second region in the thickness direction and that has a higher volumetric content of the resin than does the second region. The first region and the second region are lined up in alternating fashion in a plane along a direction intersecting the fiber direction.

A method for manufacturing a reinforced substrate for a composite material according to the present invention that achieves the aforementioned object comprises arranging reinforcing fibers so as to form a first region that includes the reinforcing fibers in which a fiber direction is aligned in a single direction, and a second region that includes the reinforcing fibers aligned in the same direction as the fiber direction and that is thinner than the first region. Furthermore, the first region and the second region are arranged so that the regions are lined up in alternating fashion in a plane along a direction intersecting the fiber direction.

DETAILED DESCRIPTION OF THE EMBODIMENTS

In order to facilitate understanding of the invention, details of an embodiment of the present invention will be described with reference to FIG. 1. The present embodiment is characterized in that a non-crimp fabric (NCF) substrate obtained using large tows is used as a reinforced substrate having a lower manufacturing cost. Hereinbelow, the relationship between the type of reinforced substrate and manufacturing cost will be described with reference to FIG. 1.

Figure 1:
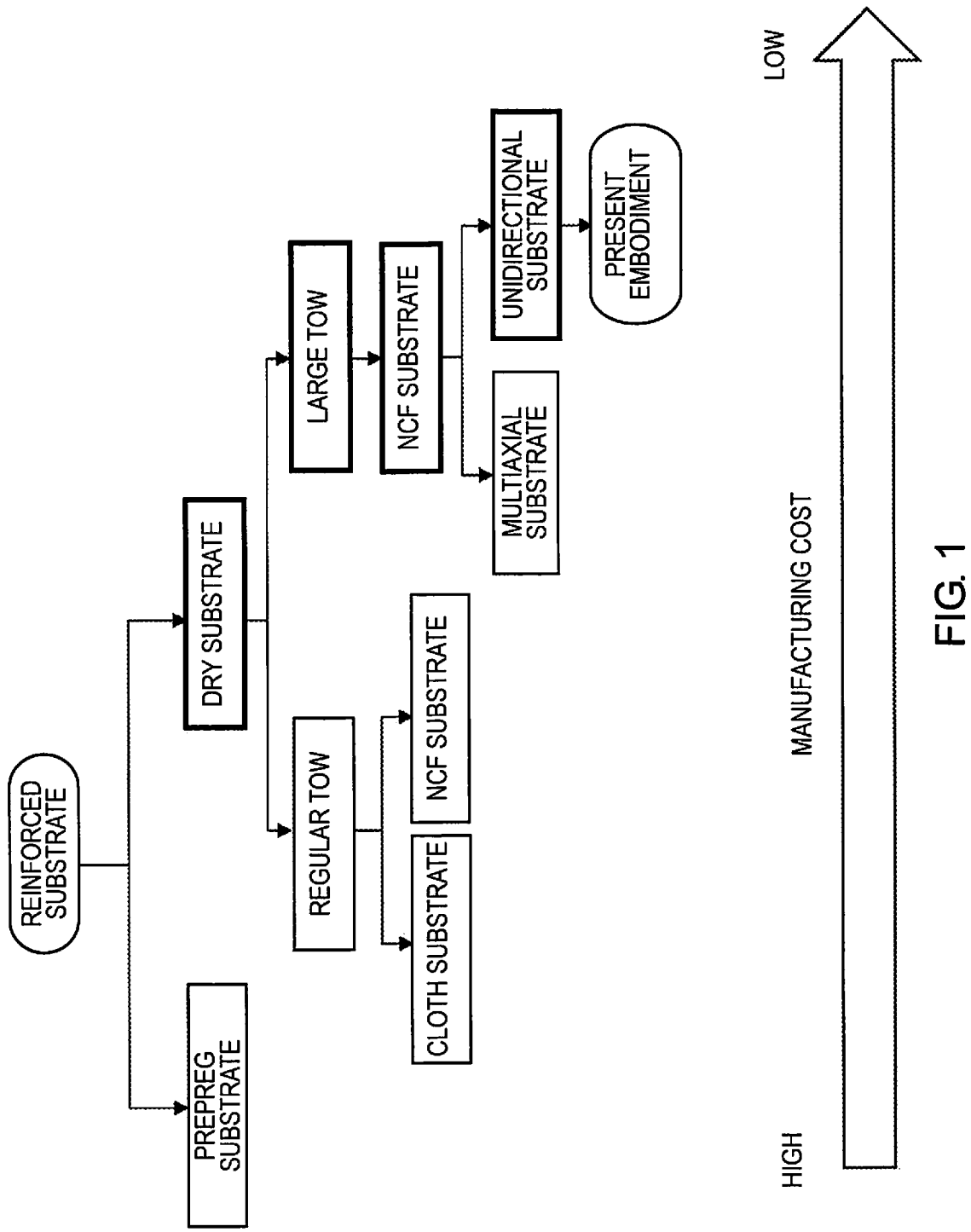
FIG. 1 is a hierarchical diagram showing a relationship between types of reinforced substrates and manufacturing cost.

FIG. 1 is a hierarchical diagram showing types of reinforced substrates categorized in terms of manufacturing cost. FIG. 1 shows that manufacturing cost decreases in progression from left to right.

Describing the hierarchical diagram from the top, firstly, reinforced substrates are broadly classified into two types: prepreg substrates, in which the reinforced substrate has been impregnated with a resin; and dry substrates that have not been impregnated with a resin. Prepreg substrates are expensive to manufacture because the reinforced substrate is impregnated with resin. For this reason, the manufacturing cost of the dry substrates is less than that of the prepreg substrates.

Ordinarily, a dry substrate is formed from fiber bundles in which a plurality of reinforcing fibers are bundled together. The fiber bundles are classified in accordance with the fiber count of the reinforcing fibers into large tows with a relatively high fiber count of the reinforcing fibers and regular tows with a relatively low fiber count of the reinforcing fibers. Here, the fiber count of the reinforcing fibers of the large tow can be set to, e.g., 40,000 or more, and the fiber count of a regular tow can be set to, e.g., 24,000 or less.

PAN-based carbon fiber is commonly used as a reinforcing fiber. PAN-based carbon fiber is continuously manufactured by way of a flameproofing step, a carbonization step, a graphitization step, a surface treatment step, and a sizing step using a manufacturing line in which bundles of PAN fibers bundled together in a predetermined count are fed in a fiber direction. In such instances, a higher fiber count of the reinforcing fibers in the fiber bundle corresponds to a larger amount of reinforcing fibers that can be manufactured in the same cycle time. Accordingly, the manufacturing cost of a fiber bundle decreases with an increase in the fiber count of the reinforcing fibers being bundled. In other words, a substrate in which large tows are used has a lower manufacturing cost than a substrate in which a regular tow is used.

Cloth substrates in which warp and weft are woven into a woven fabric, and NCF substrates in which reinforcing fibers are arranged in a single direction, are ordinarily used as dry substrates.

In a cloth substrate, the warps and wefts are knitted in intersecting fashion, whereby a crimp is formed in which the reinforcing fibers are curved. The curvature of the reinforcing fibers due to the crimp becomes excessively large when a large tow is used. Curved reinforcing fibers have less strength than reinforcing fibers extending in rectilinear fashion. Therefore, strength is likely to be dramatically reduced when the cloth substrate is manufactured using a large tow. For this reason, cloth substrates have been manufactured using a regular tow. However, there is a problem in that a regular tow has a higher manufacturing cost and is narrower than a large tow, necessitating considerable manufacturing time and resulting in poor productivity.

By contrast, crimps such as those in cloth substrates are not formed in an NCF substrate because the fibers are oriented in a single direction. Consequently, a large tow can be used in a reinforced substrate. Using a large tow in the reinforced substrate makes it possible to bring the manufacturing cost much lower than when only a regular tow is used, and productivity will rise. Furthermore, NCF substrates do not require a step for weaving warp and weft; therefore, productivity is higher than with cloth substrates.

In general, a so-called multiaxial substrate is used as an NCF substrate. In a multiaxial substrate, reinforcing fibers aligned in a single direction are oriented and laminated in two or more directions, and the intersecting reinforcing fibers are stitched and secured together. However, in such a multiaxial substrate, stitching and securing together reinforcing fibers oriented in a plurality of directions may result in lower elongation and inferior shaping properties than in cloth substrates.

Figure 2A:
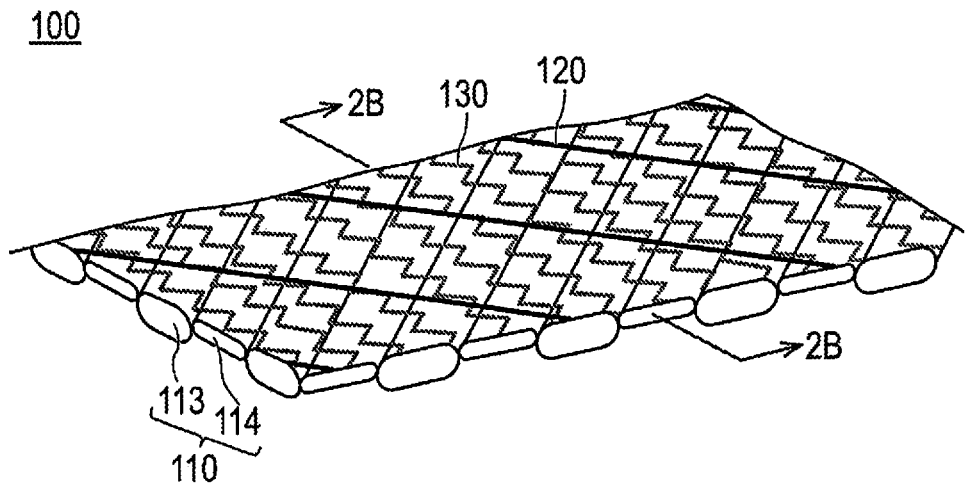
FIG. 2A is a schematic perspective view showing a reinforced substrate according to an embodiment.

Therefore, in the NCF substrate according to an embodiment of the present invention, a so-called unidirectional substrate is used in which the reinforcing fibers are not oriented along multiple axes, but are rather oriented in a single direction, as shown in FIG. 2A. This reduces the number of directions in which the reinforcing fibers are stitched and restrained, allowing the elongation of the reinforced substrate to be increased and the shaping properties to be improved. Furthermore, using a large tow in the NCF substrate allows the manufacturing cost to be dramatically reduced.

Figure 2B:
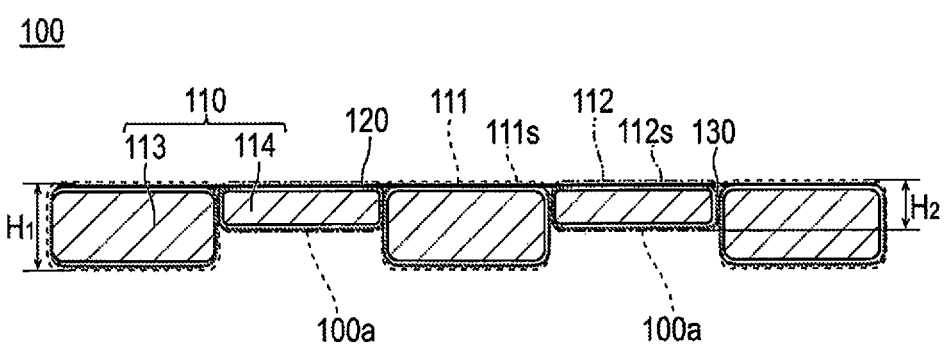
FIG. 2B is a cross-sectional view along line 2B-2B in FIG. 2A.

However, because unidirectional reinforcing fibers in a unidirectional substrate have a larger basis weight (fiber weight per unit area (g/m$^2$)), warping readily occurs when the unidirectional substrate is laminated to the same thickness and in the same direction as with a multiaxial substrate in which the reinforcing fibers are oriented in multiple axial directions. The embodiment of the present invention is characterized in that portions that differ in terms of the thicknesses of the reinforcing fibers are provided, as shown in FIG. 2B, in order to minimize the occurrence of warping.

An embodiment of the present invention is described below with reference to the accompanying drawings. The following description does not limit the technical scope or the meaning of terminology set forth in the claims. Also, the dimensional ratios in the drawings may be exaggerated for convenience of description and may differ from the actual ratios.

A composite material 10 has a reinforced substrate 100 and a resin 200. As is well known, combining the resin 200 with the reinforced substrate 100 yields a composite material 10 provided with higher strength and rigidity than can be yielded with the resin 200 alone. The composite material 10 can be applied to, e.g., the framework components of a vehicle body for an automobile, and to outer panel components. The composite material 10 weighs less than steel material, and a vehicle body can therefore be made more lightweight than a vehicle body made of assembled components comprising a steel material.

Figure 3:
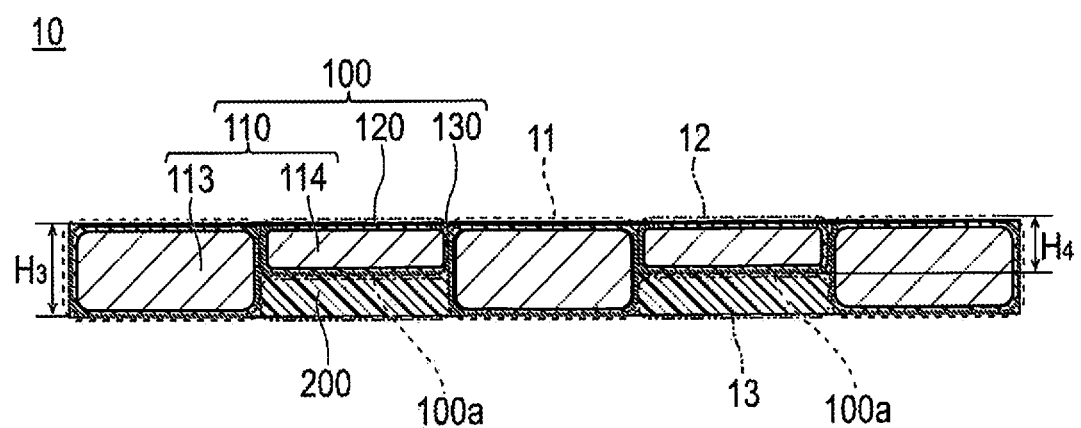
FIG. 3 is a schematic cross-sectional view showing an example of a composite material according to the present embodiment.

FIG. 3 shows a view of the composite material 10 as seen in a cross section intersecting a fiber direction of reinforcing fibers 110 (described further below). The composite material 10 has a first region 11 (the region enclosed by the broken line in FIG. 3) that includes the reinforcing fibers 110, a second region 12 (the region enclosed by the chain line in FIG. 3) that includes the reinforcing fibers 110 and is fashioned to a thickness $H_4$ that is less than a thickness $H_3$ of the first region 11, and a third region 13 (the region enclosed by the two-dot chain line in FIG. 3) formed so as to overlap the second region 12 in a thickness direction. The third region 13 is formed so that a volumetric content of the resin 200 is higher than that of the second region 12. The term "volumetric content of the resin 200" refers to a ratio of the resin 200 contained in the composite material 10 and is represented by a volume of the resin 200 included in a unit volume. In other words, the third region 13 is formed so that the volumetric content of the reinforcing fibers 110 is less than that of the second region 12. The volumetric content of the reinforcing fibers 110 being low includes a case in which the volumetric content of the reinforcing fibers 110 is zero.

In the present embodiment, the regions are formed so that a total of the thickness of the third region 13 and the thickness $H_4$ of the second region 12 is substantially equal to the thickness $H_3$ of the first region 11. A surface of the composite material 10 is thereby formed in a substantially planar shape. The regions may be formed so that the total of the thickness of the third region 13 and the thickness $H_4$ of the second region 12 is greater than the thickness $H_3$ of the first region 11, or less than the thickness $H_3$ of the first region 11.

Examples of the resin 200 include epoxy resins, urethane resins, unsaturated polyester resins, phenol resins, and other thermosetting resins, as well as polyamide (PA) resins, polypropylene (PP) resins, and other thermoplastic resins. In the present embodiment, an epoxy resin having exceptional mechanical properties and dimensional stability is used. Epoxy resins are primarily a two-component type and are used by mixing together a main agent and a curing agent. A bisphenol-A type epoxy resin is ordinarily used as the main component, and an amine-based curing agent is ordinarily used, but there is no particular limitation thereto, and selection can be made as appropriate in accordance with desired material properties.

A mold release agent may be compounded with the resin 200 to allow the composite material 10 to be readily released from the mold after molding. The type of mold release agent is not particularly limited, and any well-known mold release agent can be used.

The reinforced substrate 100 has the reinforcing fibers 110 in which the fiber direction is aligned in a single direction, auxiliary fibers 120 that are laminated on the reinforcing fibers 110, and stitching yarn 130 for stitching and joining the reinforcing fibers 110 and the auxiliary fibers 120 together, as shown in FIG. 2A.

FIG. 2B shows a view of the reinforced substrate 100 as seen in a cross section intersecting the fiber direction of the reinforcing fibers 110. The reinforced substrate 100 has a first region 111 (the region enclosed by the broken line in FIG. 2B) that includes the reinforcing fibers 110, and a second region 112 (the region enclosed by the chain line in FIG. 2B) that includes the reinforcing fibers 110 and is fashioned to a thickness $H_2$ that is less than a thickness $H_1$ of the first region 111. The first region 111 and the second region 112 are lined up in alternating fashion in a plane along a direction intersecting the fiber direction. Also, the first region 111 and the second region 112 are arranged so that surfaces 111s, 112s that constitute one of surfaces orthogonal to the thickness direction lie in the same plane. A recess 100a in which the second region 112 is recessed with respect to the first region 111 is thereby formed in the reinforced substrate 100.

During forming of the composite material 10, the recess 100a is filled with the resin 200 when the reinforced substrate 100 is impregnated with the resin 200. This produces the third region 13 in which the volumetric content of the resin 200 is higher than that of the first region 11 and the second region 12 in the cross section of the reinforced substrate 100 intersecting the fiber direction, as shown in FIG. 3.

In the present embodiment, the first region 111 and the second region 112 of the reinforced substrate 100 preserve the same shape in the composite material 10 as well. The first region 111 and the second region 112 of the reinforced substrate 100 therefore correspond to the first region 11 and the second region 12, respectively, of the composite material 10.

The reinforcing fibers 110 have a large tow (corresponding to first fiber bundles) 113 in which a plurality of reinforcing fibers 110 are bundled together, and a regular tow (corresponding to second fiber bundles) 114 in which there are fewer reinforcing fibers 110 bundled together than in the large tow 113. The fiber count of the bundled reinforcing fibers 110 of the large tow 113 is preferably 40,000 or more, and the count is about 50,000 in the present embodiment. The fiber count of the bundled fibers in the regular tow 114 is preferably 12,000 to 24,000, and the count is about 24,000 in the present embodiment.

The first region 111 of the reinforced substrate 100 includes the large tow 113, and the second region 112 includes the regular tow 114. The large tow 113 and the regular tow 114 are arranged so as to follow the surface 111s of the first region 111 and the surface 112s of the second region 112, as shown in FIG. 2B. In other words, the large tow 113 and the regular tow 114 are arranged so that surfaces thereof on one side lie in the same plane.

Examples of a material constituting the reinforcing fibers 110 include carbon fiber, glass fiber, aramid fiber, polyamide (PA) fiber, polypropylene (PP) fiber, and acrylic fiber. In the present embodiment, an example in which carbon fiber is used for the reinforcing fibers 110 will be described. Carbon fiber is characterized by a low coefficient of thermal expansion, exceptional dimensional stability, and minimal degradation in mechanical properties even at high temperatures and can therefore be advantageously used as a reinforced substrate for a composite material such as a vehicle body for an automobile.

A basis weight of the reinforcing fibers 110 may be, e.g., 50 to 400 g/m$^2$, and is more preferably 300 g/m$^2$. Setting the basis weight of the reinforcing fibers 110 to about 300 g/m$^2$ makes it possible to reduce manufacturing cost and flexibly select a dimension that corresponds to a product design.

Figure 8A:
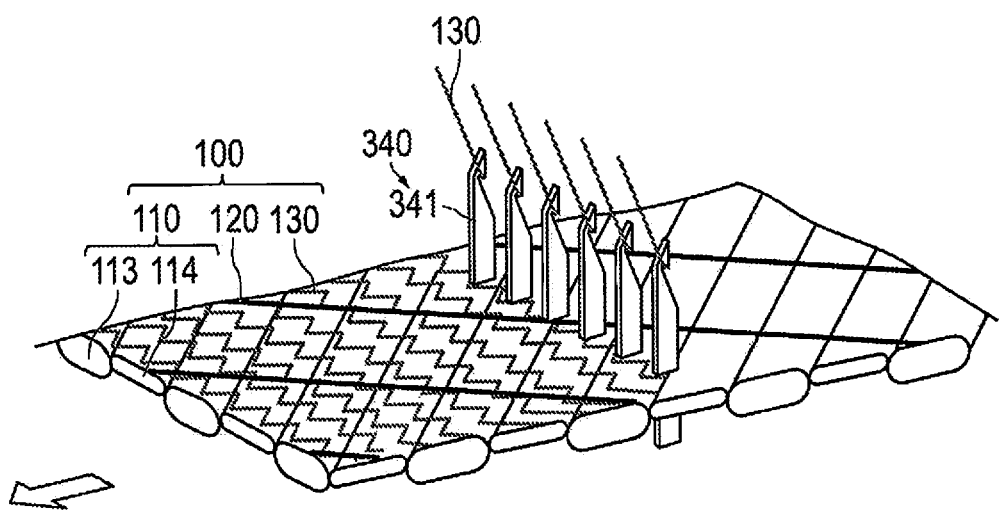
FIG. 8A is a view illustrating a procedure for manufacturing the reinforced substrate using the apparatus for manufacturing the reinforced substrate, and is a schematic view showing a stitching step.
Figure 8B:
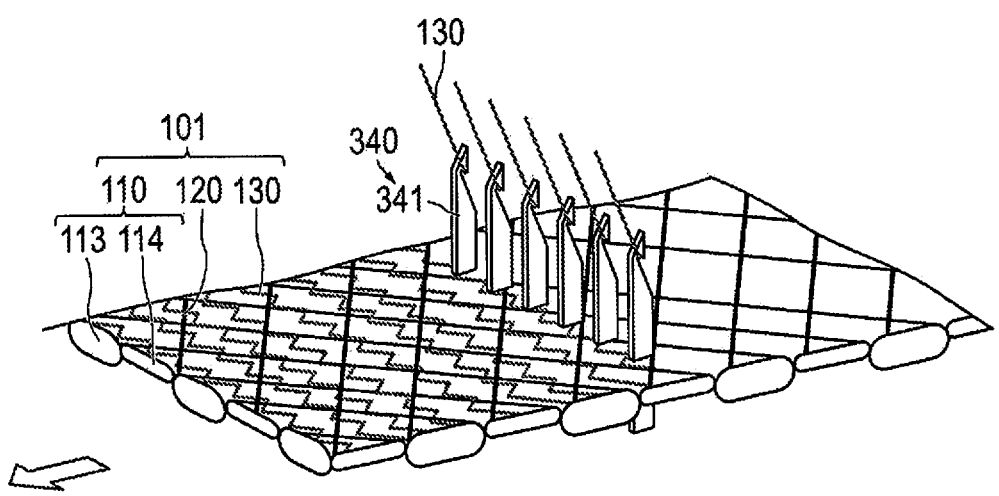
FIG. 8B is a view illustrating the procedure for manufacturing the reinforced substrate using the apparatus for manufacturing the reinforced substrate, and is a schematic view showing the stitching step.
Figure 8C:
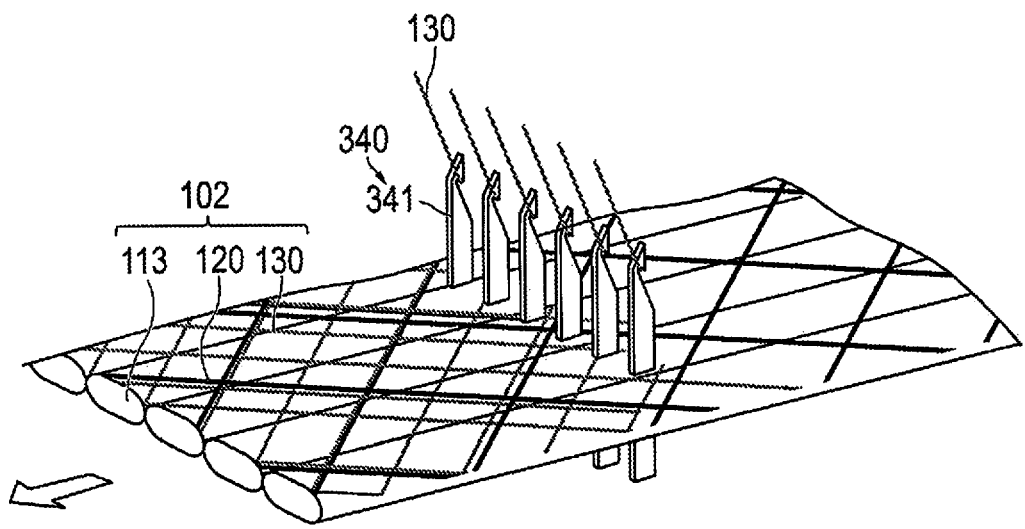
FIG. 8C is a view illustrating the procedure for manufacturing the reinforced substrate using the apparatus for manufacturing the reinforced substrate, and is a schematic view showing the stitching step.

The auxiliary fibers 120 are joined to at least some of the reinforcing fibers 110 by the stitching yarn 130 and hold the large tow 113 and the regular tow 114. The auxiliary fibers 120 are laminated on the reinforcing fibers 110 so as to follow a direction that intersects the fiber direction of the reinforcing fibers 110. In the present embodiment, the auxiliary fibers 120 are arranged in a direction orthogonal to the fiber direction of the reinforcing fibers 110. The auxiliary fibers 120 are not limited to the configuration of being oriented in a single direction, as shown in FIG. 2A; the auxiliary fibers 120 may also be configured as a mesh, as shown in FIG. 8C.

A material having a lower modulus of elasticity and a higher tensile elongation at break than the reinforcing fibers 110 is preferably used for the auxiliary fibers 120. This allows the auxiliary fibers 120 to deform flexibly in association with the deformation occurring when the reinforced substrate 100 is shaped, and to hold the reinforcing fibers 110 reliably and without breaking.

Examples of the material constituting the auxiliary fibers 120 include glass fiber, aramid fiber, carbon fiber, nylon fiber, and polyethylene (PE) fiber. Because carbon fiber is used for the reinforcing fibers 110 in the present embodiment, glass fiber having a lower modulus of elasticity and a higher tensile elongation at break than carbon fiber is used. Glass fiber has relatively high strength and low material cost and can therefore be advantageously used for the auxiliary fibers 120.

In the present embodiment, the auxiliary fibers 120 are laminated so as to intersect the reinforcing fibers 110, and the points of intersection of the auxiliary fibers 120 and the reinforcing fibers 110 are secured by the stitching yarn 130. Accordingly, the reinforcing fibers 110 can be prevented from separating from each other, and handling of the reinforced substrate 100 is facilitated in the process of conveyance, cutting, shaping, and molding of the reinforced substrate 100. Also, the arrangement of the large tow 113 and the regular tow 114 can be secured by the auxiliary fibers 120 and the stitching yarn 130.

Apparatus for Manufacturing Reinforced Substrate

An apparatus 300 for manufacturing the reinforced substrate 100 will be described below with reference to FIG. 4.

The manufacturing apparatus 300 has a plurality of bobbins 310, an orientation section 320, a laminating section 330, a stitching section 340, a belt conveyor 350, and a windup roller 360.

Figure 5:
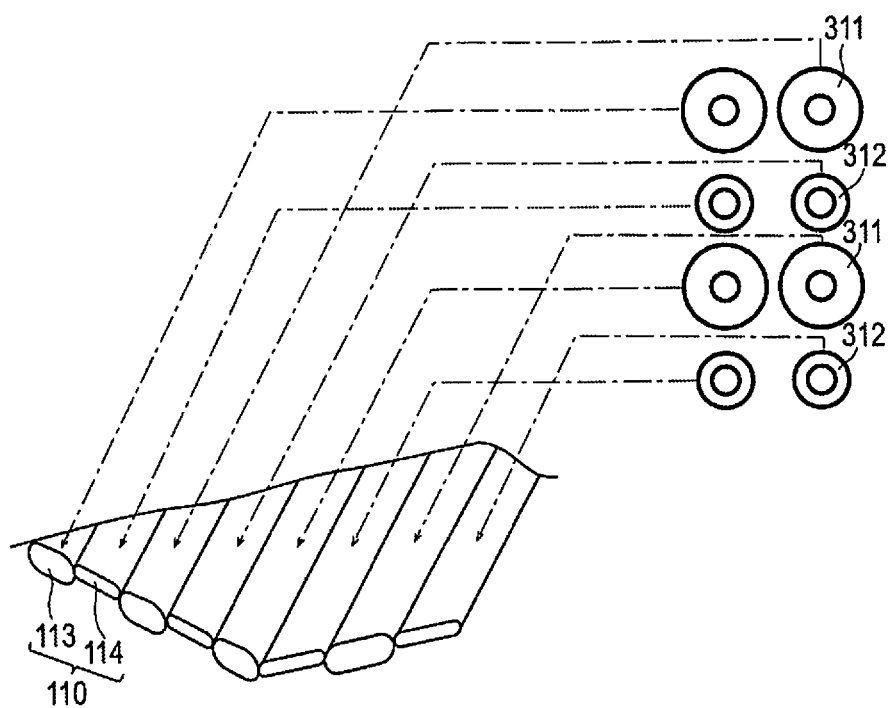
FIG. 5 is a schematic view showing an arrangement of bobbins in the apparatus for manufacturing the reinforced substrate.

The plurality of bobbins 310 hold the reinforcing fibers 110 and the auxiliary fibers 120, which are in a wound-up state, so as to allow the fibers to be drawn out. The bobbins 310 are provided with a first bobbin 311 on which the large tow 113 is wound, a second bobbin 312 on which the regular tow 114 is wound, and a third bobbin 313 on which the auxiliary fibers 120 are wound. The first bobbin 311 and the second bobbin 312 are arranged so that the large tow 113 and the regular tow 114 are lined up in alternating fashion in a plane along a direction intersecting the fiber direction of the reinforcing fibers 110, as shown in FIG. 5.

The orientation section 320 orients and arranges the reinforcing fibers 110 in a predetermined fiber direction. The laminating section 330 laminates the auxiliary fibers 120 onto the arranged reinforcing fibers 110.

In the stitching section 340, the reinforcing fibers 110 and the auxiliary fibers 120 are stitched and joined together to form the reinforced substrate 100. As shown in FIGS. 8A-8C, the stitching section 340 is provided with a knitting needle 341 for stitching the reinforcing fibers 110 and the auxiliary fibers 120 by using the stitching yarn 130.

The belt conveyor 350 continuously conveys the reinforcing fibers 110 and the auxiliary fibers 120. The configuration for conveying the reinforcing fibers 110 and the auxiliary fibers 120 is not limited to the belt conveyor 350, and may involve, e.g., a conveyance robot.

The windup roller 360 winds up and holds the reinforced substrate 100 in a roll.

The functioning of the manufacturing apparatus 300 is controlled by a control unit 500. The configuration of the control unit 500 will be described in further detail below.

Apparatus for Molding Composite Material

Figure 6:
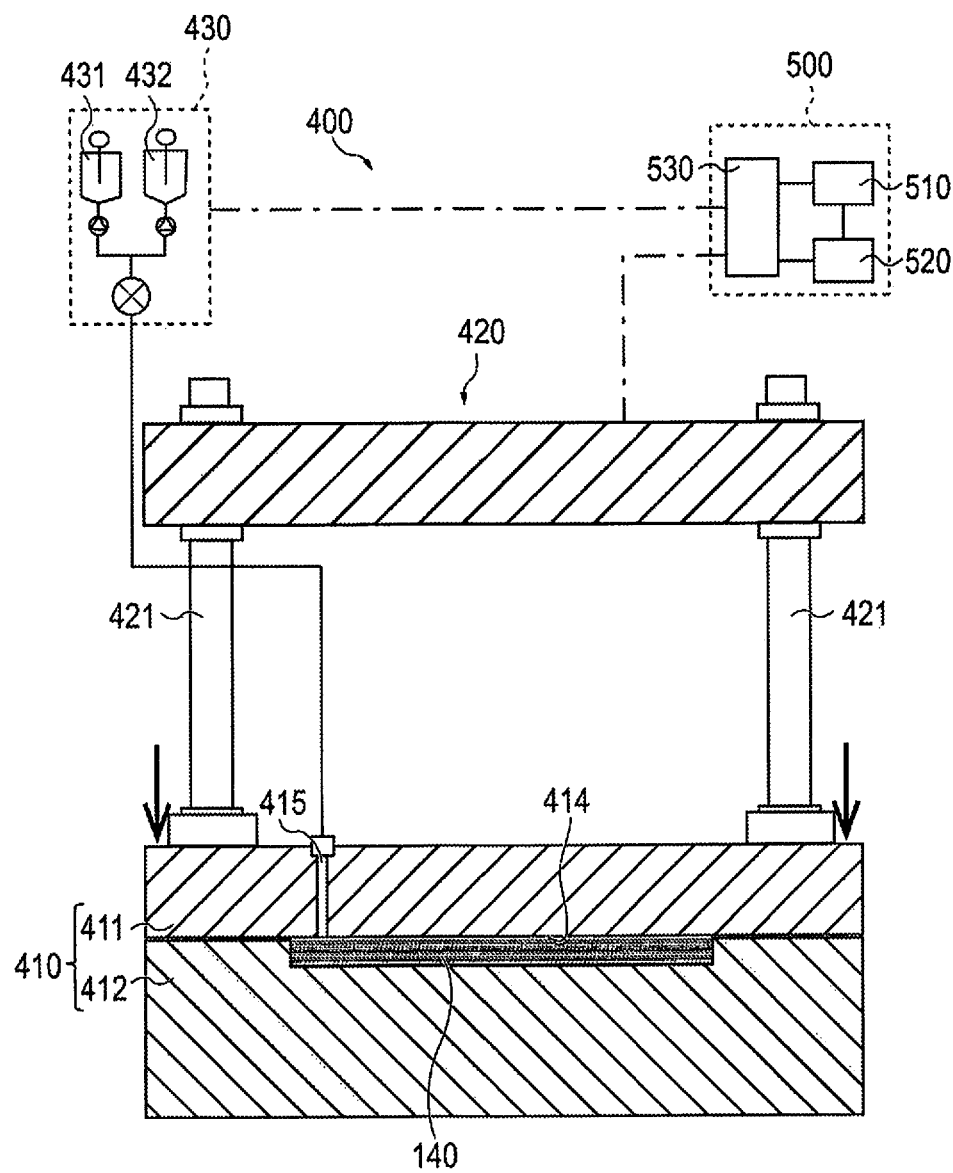
FIG. 6 is a schematic view showing an apparatus for molding the composite material.

An apparatus 400 for molding the composite material 10 will be described with reference to FIG. 6.

The apparatus 400 for molding the composite material 10 has: an openable/closable mold 410 that forms a cavity 414 in which a laminate 140 (see FIG. 10) is arranged, the laminate having a plurality of laminated reinforced substrates 100, 101, 102; a press section 420 for applying a clamping pressure to the mold 410; and a resin injection section 430 for injecting the resin 200 into the cavity 414.

The mold 410 has: a pair of openable/closable molds, namely, an upper mold 411 and a lower mold 412; and an injection port 415 through which the resin 200 is injected into the cavity 414.

The injection port 415 is provided so that the cavity 414 and the resin injection portion 430 can communicate with each other. The interior of the laminate 140 is impregnated through the surface with the resin 200 injected from the resin injection section 430. A suction port for suctioning air by evacuating the interior of the cavity 414 may be separately provided to the mold 410.

The press section 420 is provided with a cylinder 421 in which hydraulic pressure or other fluid pressure is used and can be configured from a press capable of adjusting the clamping pressure applied to the mold 410 by controlling the hydraulic pressure or the like.

The resin injection section 430 is configured from a known circulation-type pump mechanism capable of supplying a main agent supplied from a main agent tank 431 and a curing agent supplied from a curing agent tank 432 to the mold 410 while circulating the main agent and the curing agent. The resin injection section 430 communicates with the injection port 415 and injects the resin 200 into the cavity 414.

The control unit 500 controls the functioning of the manufacturing apparatus 300 and the molding apparatus 400. Referring to FIGS. 4 and 6, the control unit 500 has a storage unit 510, a computation unit 520, and an input/output unit 530 via which a variety of data and control instructions are sent and received. The input/output unit 530 is electrically connected to the bobbins 310, the orientation section 320, the laminating section 330, the stitching section 340, the belt conveyor 350, the windup roller 360, the press section 420, the resin injection section 430, and other device sections.

The storage unit 510 is configured from ROM and RAM, and stores data for, inter alia, alignment of the large tow 113 and regular tow 114, and arrangement of the reinforcing fibers 110, the auxiliary fibers 120, and the stitching yarn 130. The computation unit 520 is mainly composed of a CPU, and receives data for, inter alia, an arrangement of the reinforcing fibers 110 and the auxiliary fibers 120 via the input/output unit 530. The computation unit 520 calculates, inter alia, the arrangement of the auxiliary fibers 120 and positions at which the auxiliary fibers are stitched by the stitching yarn 130, the calculations being performed on the basis of data read out from the storage unit 510 and data received from the input/output unit 530. Control signals based on the calculated data are transmitted to the bobbins 310, the orientation section 320, the laminating section 330, the stitching section 340, the belt conveyor 350, the windup roller 360, the press section 420, the resin injection section 430, and the like via the input/output unit 530. Thus, the control unit 500 controls, inter alia, the alignment of the large tow 113 and the regular tow 114, and the arrangement of the reinforcing fibers 110, the auxiliary fibers 120, and the stitching yarn 130 in the reinforced substrate 100.

Method for Manufacturing Reinforced Substrate

Described next is a method for manufacturing the reinforced substrates 100, 101, 102 according to an embodiment.

In the present embodiment, three types of reinforced substrates 100, 101, 102 are manufactured, namely, a reinforced substrate 100 (see FIGS. 2 and 8A) in which a fiber direction θ of the reinforcing fibers 110 is +45°, a reinforced substrate 101 (see FIG. 8B) in which the fiber direction θ is −45°, and a reinforced substrate 102 (see FIG. 8C) in which the fiber direction θ is 0°. The reinforced substrate 101 has a first region 111 and a second region 112 in the same manner as the reinforced substrate 100. Only the large tow 113 is used in the reinforced substrate 102, and the reinforcing fibers 110 are arranged in the substrate in a substantially uniform manner. The arrows in FIGS. 4, 8A to 8C, and 9 show a conveyance direction of the reinforcing fibers 110, the fiber direction θ being an orientation angle of the reinforcing fibers 110 with respect to the conveyance direction (see FIG. 4).

Figure 7A:
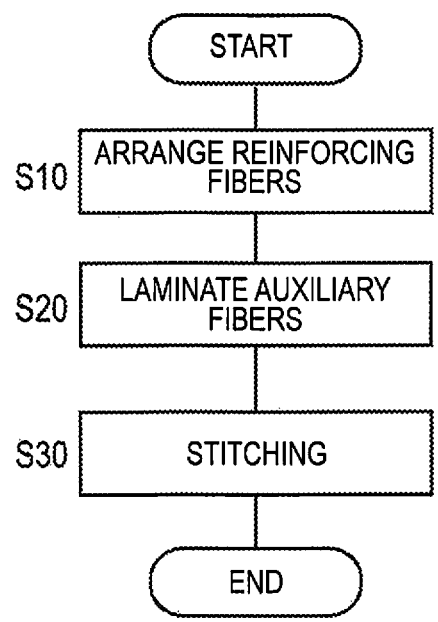
FIG. 7A is a flowchart showing a method for manufacturing the reinforced substrate.

The method for manufacturing the reinforced substrates 100, 101 has a step for arranging the reinforcing fibers 110 (step S10), a step for laminating the auxiliary fibers 120 (step S20), and a step for stitching and joining the reinforcing fibers 110 and the auxiliary fibers 120 together (step S30), as shown in FIG. 7A. Each step is described below.

First, a plurality of first bobbins 311 and a plurality of second bobbins 312 are set in alternating fashion, as shown in FIG. 5.

Figure 4:
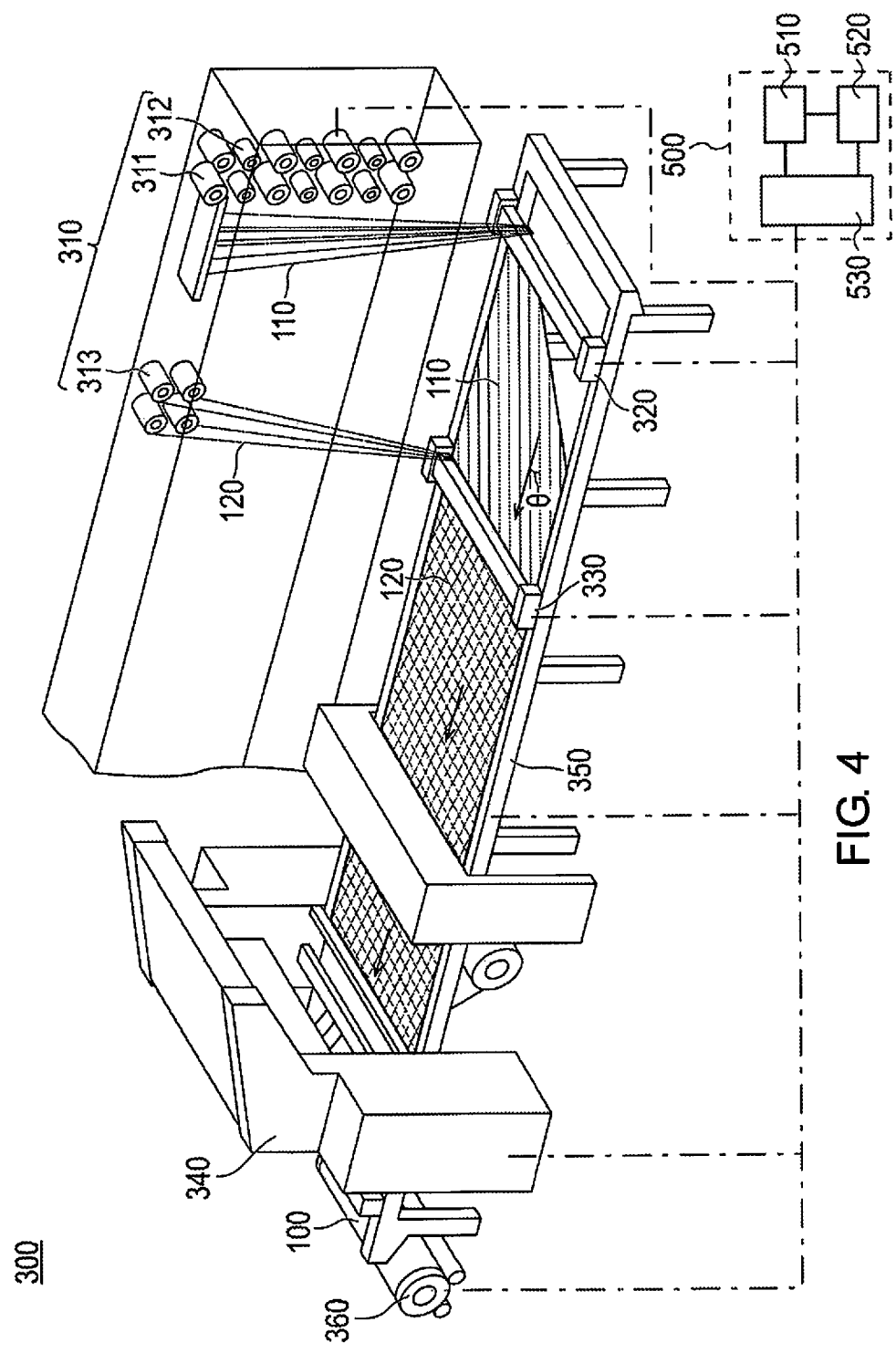
FIG. 4 is a schematic view showing an apparatus for manufacturing the reinforced substrate.

Next, in step S10, the large tow 113 is drawn out from the first bobbin 311 and the regular tow 114 is drawn out from the second bobbin 312 by the orientation section 320, as shown in FIG. 4. The large tow 113 and the regular tow 114 are arranged so that the fiber direction θ of the reinforcing fibers 110 is in a single direction. At this time, the large tow 113 and the regular tow 114 are aligned so as to be lined up in alternating fashion in a plane along the direction intersecting the fiber direction θ. The arranged reinforcing fibers 110 are conveyed to the laminating section 330 by the belt conveyor 350.

Next, in step S20, the auxiliary fibers 120 are laminated on the reinforcing fibers 110 by the laminating section 330. At this time, the auxiliary fibers 120 are laminated on the reinforcing fibers 110 so as to follow the direction that intersects the fiber direction θ. In the present embodiment, the auxiliary fibers 120 are arranged in a direction orthogonal to the fiber direction θ.

Next, in step S30, the reinforcing fibers 110 and the auxiliary fibers 120 are stitched and joined together by the stitching yarn 130 using the knitting needle 341 of the stitching section 340. FIG. 8A shows the manner in which the reinforcing fibers 110 having a fiber direction θ of +45° are stitched. FIG. 8B shows the manner in which the reinforcing fibers 110 having a fiber direction θ of −45° are stitched. A sheet-form reinforced substrate 100 having a fiber direction θ of +45° and a sheet-form reinforced substrate 101 having a fiber direction θ of −45° are thereby completed.

In steps S20 and S30, the arrangement of the auxiliary fibers 120 and the positions at which the auxiliary fibers are stitched by the stitching yarn 130 are controlled on the basis of the arrangement of the first region 111 and the second region 112 of the reinforcing fibers 110. In the present embodiment, the functioning of the orientation section 320, the laminating section 330, and the stitching section 340 is synchronized by the control unit 500 to perform the operation of each process. The mutually intersecting reinforcing fibers 110 and auxiliary fibers 120 can thereby be reliably stitched by the stitching yarn 130.

The reinforced substrates 100, 101 are then wound up and held in the form of a roll by the windup roller 360.

The reinforced substrate 102 having a fiber direction θ of 0° is formed by laminating the auxiliary fibers 120 in the same manner as the reinforced substrates 100, 101 having fiber direction θ of ±45°, as shown in FIG. 8C, and the reinforcing fibers 110 and the auxiliary fibers 120 are stitched together with the stitching yarn 130. Only the large tow 113 is used for the reinforcing fibers 110 in the reinforced substrate 102. The cost of manufacturing the reinforced substrate 102 can thereby be reduced to a much greater extent than when only a regular tow 114 is used. Also, the auxiliary fibers 120 are formed as a mesh. The reinforcing fibers 110 can thereby be more reliably held.

Figure 9:
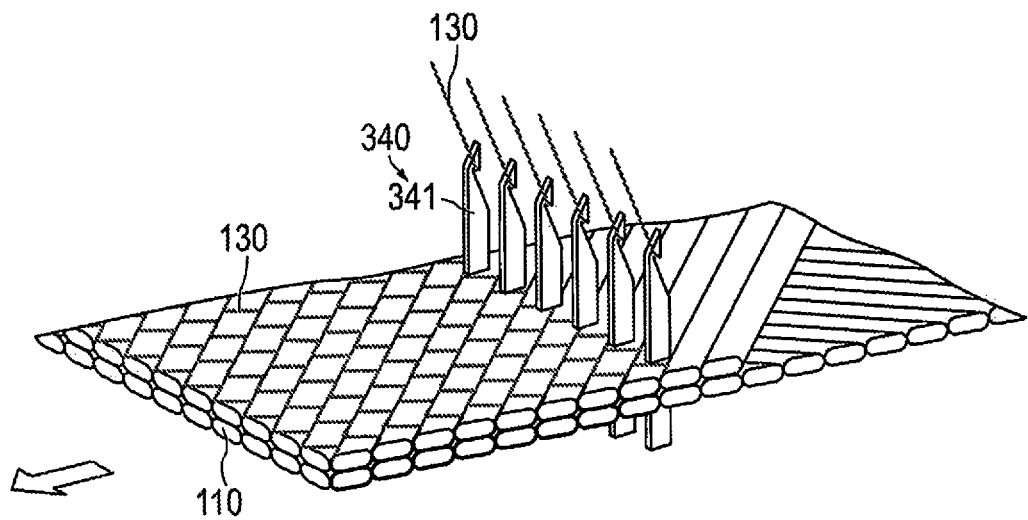
FIG. 9 is a view illustrating the procedure for manufacturing the reinforced substrate according to a comparative example, and is a schematic view showing the stitching step.

In the case that the reinforced substrate is a multiaxial substrate, the reinforcing fibers 110 aligned in a single direction are oriented and laminated in two or more directions, as shown in FIG. 9, and the intersecting reinforcing fibers 110 are stitched together by the stitching yarn 130. Accordingly, the reinforcing fibers 110 deform less readily and the shaping properties dramatically deteriorate. The reinforced substrates 100, 101, 102 according to the present embodiment are unidirectional substrates in which the reinforcing fibers 110 aligned in a single direction are used.

Therefore, the reinforced substrates 100, 101, 102 can have much better shaping properties than a multiaxial substrate.

Method for Molding Composite Material

Next, the method for molding the composite material 10 according to an embodiment will be described. Resin transfer molding (RTM), which offers high productivity and is suitable for mass production, is used as a method for molding the composite material 10. In the RTM method, the composite material 10 is molded by arranging the reinforced substrate 100 in the mold 410 (see FIG. 6), and impregnating and curing the resin 200.

Figure 7B:
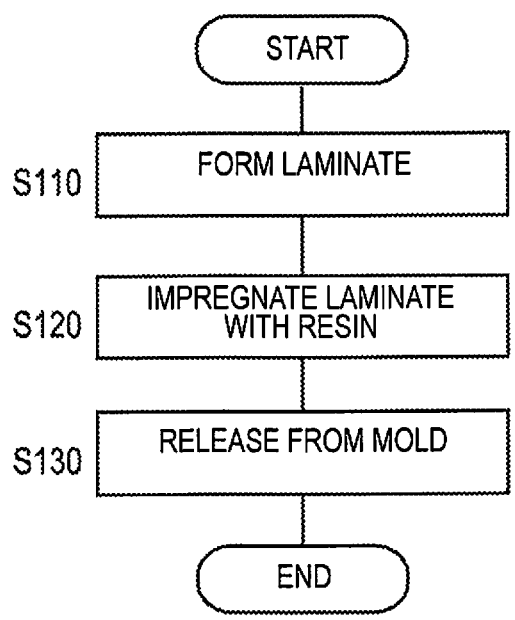
FIG. 7B is a flowchart showing a method for molding the composite material.

The method for manufacturing the composite material 10 has a step for forming the laminate 140 (step S110), a step for impregnating the laminate 140 with the resin 200 (step S120), and a step for removing the composite material 10 from the mold (step S130), as shown in FIG. 7B. Each step is described below.

First, the reinforced substrates 100, 101, 102 wound up on the windup roller 360 are prepared by being drawn out and cut to a predetermined size.

Figure 10:
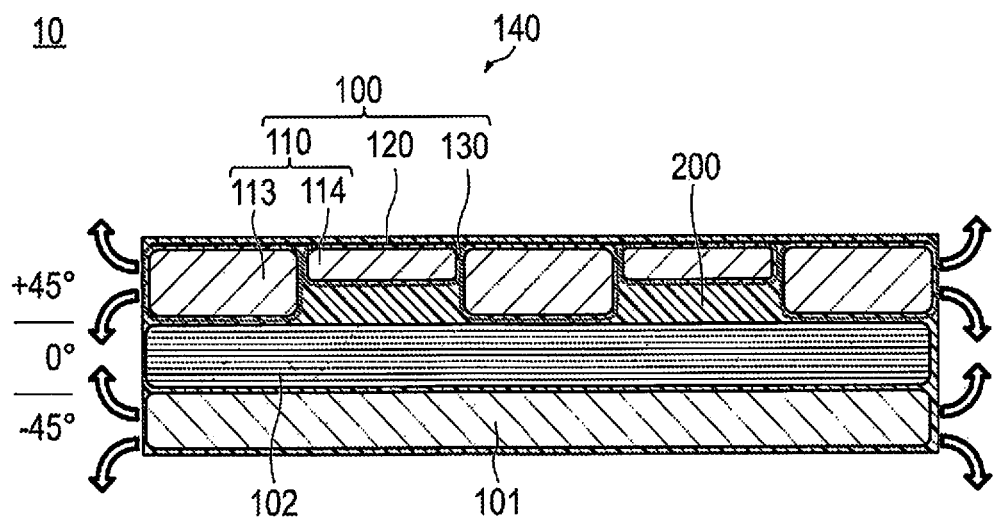
FIG. 10 is a schematic cross-sectional view showing a laminate obtained by laminating the reinforced substrate according to the present embodiment.

Next, in step S110, the reinforced substrates 100, 101, 102 are laminated in a predetermined laminated configuration to form the laminate 140. In the present embodiment, the reinforced substrate 102 is laminated so as to be sandwiched from both sides by the reinforced substrates 100, 101, as shown in FIG. 10. The laminated configuration becomes +45°/0°/−45° and is an asymmetric lamination. "Asymmetric" means that the fiber directions are laminated asymmetrically with respect to a center plane of the laminate 140 in the lamination direction. This laminated configuration is not given by way of limitation and can be selected as appropriate depending on material properties required for the composite material 10 shaped as a molded article.

Figure 11:
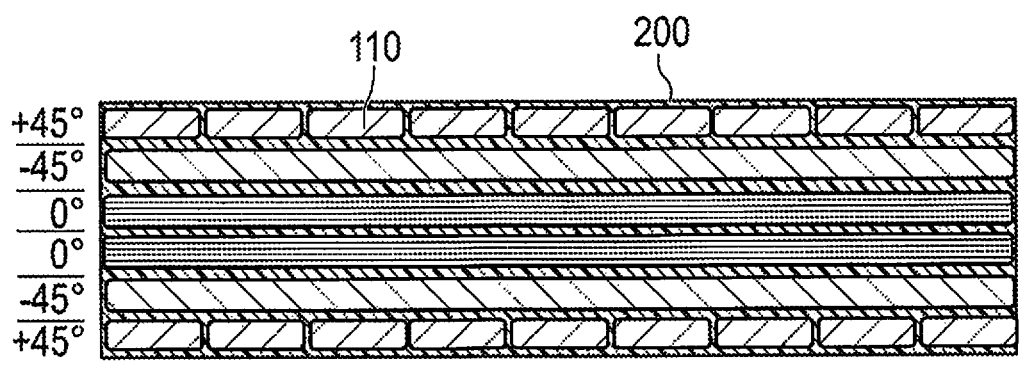
FIG. 11 is a schematic cross-sectional view showing a laminate obtained by laminating the reinforced substrate according to the comparative example.

In general, the laminate 145 is layered symmetrically in a ±45°/0°/0°/±45° laminated configuration, as shown in FIG. 11, whereby the laminate 145 is configured so that any warping between the laminations is eliminated. "Symmetry" means that laminating is performed with the fiber directions in symmetry with reference to the center plane of the laminate in the laminating direction. Because of the large basis weight of the reinforced substrates 100, 101, 102 in which a large tow is used as in the present embodiment, the composite material 10 becomes unnecessarily thick when symmetrical lamination is carried out. This makes it difficult to design the composite material to a desired thickness. Therefore, in the present embodiment, the lamination is configured asymmetrically, as shown in FIG. 10. This makes it possible to minimize any unnecessary increase in the thickness of the composite material 10.

Forming the first region 111 and the second region 112 on the reinforced substrate 100 as in the present embodiment makes it possible to produce a reaction force to counteract warping. Accordingly, even when the lamination configuration is asymmetrical, adjusting the ratio of the first region 111 and the second region 112 makes it possible to produce a reaction force so that the warping of the laminate 140 is cancelled out, as shown in FIG. 10. The thickness of the composite material 10 can thereby be limited and the occurrence of warping in the composite material 10 can be minimized.

The resin 200 is subsequently injected into the cavity 414 of the mold 410 to impregnate the laminate 140 with the resin 200 in step S120. The mold 410 is then gradually heated so that a temperature thereof is raised to a curing temperature of the resin 200 to cure the resin 200. When the resin 200 is a thermoplastic resin, the mold 410 may be cooled to bring about curing. The reinforced substrate 100 is impregnated with the resin 200, which is also filled into the recess 100a of the reinforced substrate 100. The third region 13, which has a higher volumetric content of the resin 200 than does the first region 11 and the second region 12, is thereby formed in a cross section of the reinforced substrate 100 intersecting the fiber direction, as shown in FIG. 3.

The resin 200 is subsequently cured in step S130, the mold 410 is then opened, and the composite material 10 is released from the mold to complete molding.

A mechanism for minimizing warping in the composite material 10 is described hereinbelow with reference to FIGS. 12A-13.

The resin 200 shrinks when the reinforced substrate 100 is impregnated with the resin 200 and the resin is cured. In the case of a composite material in which the reinforced substrate having the reinforcing fibers 110 oriented in a single direction has been impregnated with the resin 200, as shown in FIG. 12A, the resistance of the reinforced substrate 100 to the shrinking of the resin 200 is greater in the fiber direction than in the direction intersecting the fiber direction. In particular, the resistance of the reinforced substrate 100 to the shrinking of the resin 200 is very low in the direction orthogonal to the fiber direction. Accordingly, the percentage by which the composite material shrinks together with the shrinking of the resin 200 is lower than in the direction intersecting the fiber direction. Warping therefore occurs in the composite material in a direction indicated by the arrow in FIG. 12B, caused by a difference in the shrinkage percentage of the composite material in the fiber direction and the direction intersecting the fiber direction, as shown in FIG. 12B.

In the present embodiment, the reinforced substrate 100 has a first region 111 that includes the reinforcing fibers 110, and a second region 112 that includes the reinforcing fibers 110 and is fashioned to the thickness $H_2$, which is less than the thickness $H_1$ of the first region 111. Filling the reinforced substrate 100 with the resin 200 produces the first region 11, the second region 12 fashioned to a thickness $H_4$ that is less than the thickness $H_3$ of the first region 11, and a third region 13 formed so as to overlap the second region 12 in a thickness direction, as shown in FIG. 3. In the present embodiment, the third region 13 is formed so that the volumetric content of the resin 200 is higher than that of the second region 12.

Figure 13:
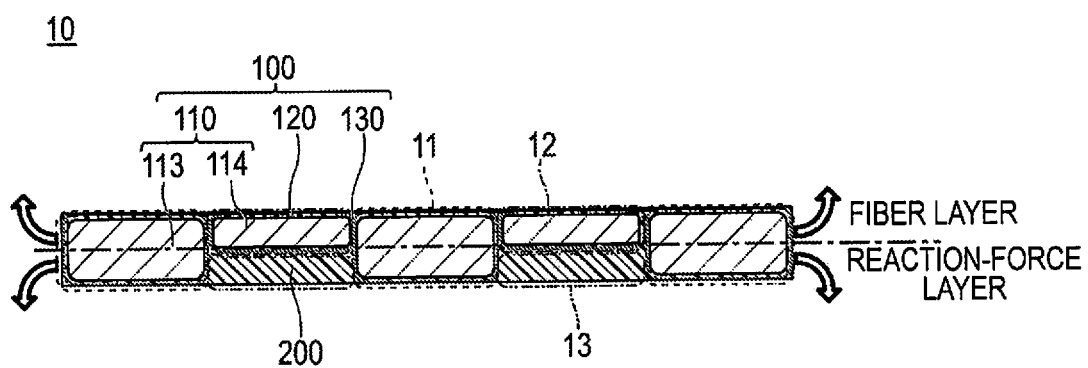
FIG. 13 is a view illustrating the mechanism by which warping is minimized, and is a schematic cross-sectional view showing the composite material according to the present embodiment.

The composite material 10 is bisected at an interface between the second region 12 and the third region 13 (a plane intersecting the thickness direction), as shown in FIG. 13. In the present embodiment, a side of the reinforced substrate 100 on which the reinforcing fibers 110 are arranged over the entire surface is referred to as a "fiber layer," and a side of the reinforced substrate 100 on which the first region 11 and the third region 13 are aligned in alternating fashion is referred as a "reaction-force layer."

Figure 12A:
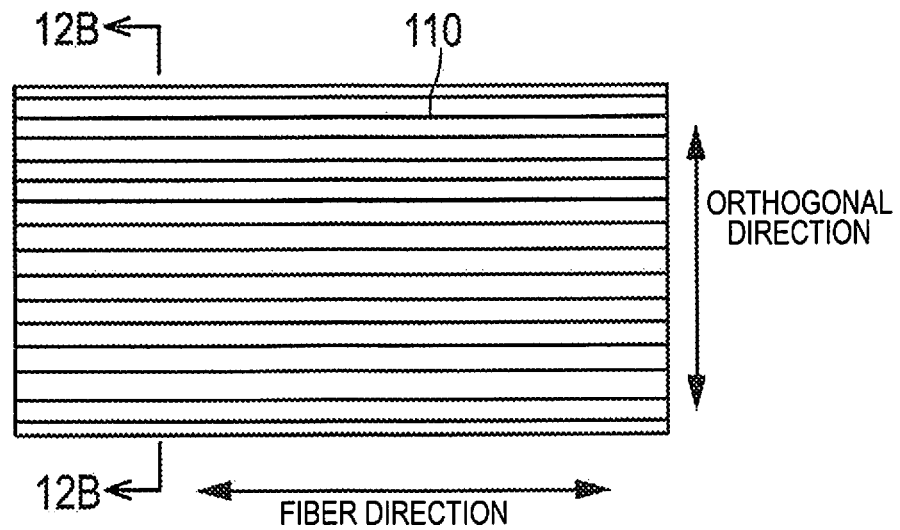
FIG. 12A is a view illustrating a mechanism by which warping occurs, and is a plan view of the composite material in which the reinforced substrate having fibers oriented in a single direction is used.
Figure 12B:
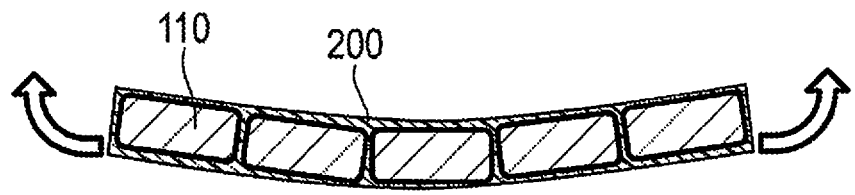
FIG. 12B is a view illustrating the mechanism by which warping occurs, and is a cross-sectional view along line 12B-12B in FIG. 12A.

Warping occurs in the fiber layer in the direction orthogonal to the fiber direction in the same manner as in the reinforced substrate oriented in a single direction, as shown in FIGS. 12A and 12B. In the present embodiment, a force that produces warping in the composite material 10 is referred to as a warping force.

In the reaction-force layer, the first region 11 and the third region 13 are arranged in alternating fashion along the direction intersecting the fiber direction of the reinforcing fibers 110, as shown in FIG. 13. Shrinkage of the resin 200 in the fiber direction is minimized by the reinforcing fibers 110 included in the first region 11. Because the volumetric content of the resin 200 is greater in the third region 13 than in the second region 12, the percentage by which the composite material 10 shrinks in the third region 13 together with the shrinking of the resin 200 is higher than that in the second region 12 of the fiber layer. With a shrinkage force of the resin 200 that acts in the direction intersecting the fiber direction in the third region 13A, a reaction force can be produced in an opposite direction to the warping force. Warping of the composite material 10 can be minimized by this reaction force.

The foregoing description explains the mechanism that minimizes warping of the composite material 10 in which a single reinforced substrate 100 is used, but it is possible to minimize the occurrence of warping by the same mechanism in a laminate 140 in which a plurality of reinforced substrates 100 have been laminated (see FIG. 10).

As described above, the reinforced substrate 100 of the present embodiment has a first region 111 that includes the reinforcing fibers 110 in which the fiber direction is aligned in a single direction, and a second region 112 that is fashioned to the thickness $H_2$ and that includes the reinforcing fibers 110 in which the fiber direction is aligned in a single direction. The thickness $H_2$ is less than the thickness $H_1$ of the first region 111. The first region 111 and the second region 112 are lined up in alternating fashion in a plane along the direction intersecting the fiber direction.

In the reinforced substrate 100 configured in this manner, and in the composite material 10 provided with the reinforced substrate 100, the second region 112 of the reinforced substrate 100 is fashioned to the thickness $H_2$, which is less than the thickness $H_1$ of the first region 11. A recess 100a that does not include the reinforcing fibers 110 is therefore formed in the second region 112 so as to overlap in the thickness direction. The recess 100a is filled with the resin 200 when the reinforced substrate 100 is impregnated with the resin and the composite material 10 is molded. In the molded composite material 10 as viewed in a cross section intersecting the fiber direction of the reinforcing fibers 110, a portion having a high volumetric content of the reinforcing fibers 110 and a portion having a low volumetric content of the reinforcing fibers 110 (including a volumetric content of zero) are formed in the thickness direction of the second region 112. The portion having a low volumetric content of the reinforcing fibers 110 has a volumetric content of the resin 200 that increases in relative terms with respect to the portion having a high volumetric content of the reinforcing fibers 110. In the portion having a high volumetric content of the resin 200, the percentage by which the composite material 10 shrinks together with the shrinkage of the resin 200 is greater than in the portion having a low volumetric content of the resin 200. As a result, it is possible to produce a reaction force in the opposite direction to the warping force of the composite material 10 caused by the shrinkage of the resin 200. Warping produced in the composite material 10 can thereby be minimized.

The first region 11, 111 includes the large tow (first fiber bundle) 113 in which a plurality of reinforcing fibers 110 have been bundled together. The second region 12, 112 includes the regular tow (second fiber bundle) 114 in which fewer fibers than in the large tow 113 have been bundled together. Using the large tow 113 as the reinforcing fibers 110 improves productivity to a greater extent than when only the regular tow 114 is used. Also, arranging the large tow 113 in the first region 111 and arranging the regular tow 114 in the second region 112 makes it possible to reliably form a portion having a high volumetric content of the reinforcing fibers 110 and a portion having a low volumetric content of the reinforcing fibers 110. Warping produced in the composite material 10 can thereby be minimized.

The first region 11, 111 and the second region 12, 112 are formed so that surfaces 111s, 112s that constitute one of surfaces orthogonal to the thickness direction lie in the same plane. A recess 100a can be formed on one side of the composite material 10 obtained using a single reinforced substrate 100, as viewed in a cross section intersecting the fiber direction of the reinforcing fibers 110. This makes it possible to produce a reaction force in the opposite direction to the warping force that generates warping in the composite material 10 of a single reinforced substrate 100 as well. Therefore, warping that occurs in the composite material 10 can be reliably minimized.

The reinforced substrate 100 also has auxiliary fibers 120 that are arranged on the reinforcing fibers 110 so as to follow in a direction intersecting the fiber direction. The auxiliary fibers 120 are joined at least to a part of the reinforcing fibers 110 to hold the reinforcing fibers 110. This makes it possible to minimize variation in the reinforcing fibers 110 during molding of the composite material 10 in which the reinforced substrate 100 is used, and to reliably preserve the first region 111 and the second region 112 of the reinforced substrate 100. As a result, warping that occurs in the composite material 10 can be reliably minimized.

The reinforced substrate 100 further has a stitching yarn 130 for stitching and joining the reinforcing fibers 110 and the auxiliary fibers 120 together. The first region 111 and second region 112 of the reinforced substrate 100 can thereby be more reliably preserved.

The auxiliary fibers 120 have a lower modulus of elasticity than do the reinforcing fibers 110. This allows the auxiliary fibers 120 to deform flexibly in association with the deformation occurring when the reinforced substrate 100 is shaped and to reliably hold the reinforcing fibers 110 without breaking.

The auxiliary fibers 120 have a higher tensile elongation at break than do the reinforcing fibers 110. The auxiliary fibers 120 are thereby less likely to break than the reinforcing fibers 110, and the reinforcing fibers 110 can be reliably held.

The composite material 10 of the present embodiment has: a first region 11 that includes the reinforcing fibers 110 in which the fiber direction is aligned in a single direction; a second region 12 that includes the reinforcing fibers 110 in which the fiber direction is aligned in a single direction, and that is fashioned to the thickness $H_4$, which is less than the thickness $H_3$ of the first region 11; and a third region 13 that is formed so as to overlap the second region 12 in the thickness direction and that has a higher volumetric content of the resin 200 than does the second region 12. The first region 11 and the second region 12 are lined up in alternating fashion in a plane along the direction intersecting the fiber direction.

According to the composite material 10 configured in this manner, in the third region 13, which has a high the volumetric content of the resin 200, the percentage by which the composite material 10 shrinks together with the shrinkage of the resin 200 is higher than in the second region 12, which has a low volumetric content of the resin 200. As a result, a reaction force can be produced in the opposite direction to the warping force of the composite material 10 produced by the shrinking of the resin 200. Warping that occurs in the composite material 10 can thereby be minimized.

A method for manufacturing the reinforced substrate 100 of the present embodiment comprises arranging reinforcing fibers 110 so as to form a first region 111 that includes the reinforcing fibers 110 in which the fiber direction is aligned in a single direction, and a second region 112 that includes the reinforcing fibers 110 aligned in the same direction as the fiber direction and is fashioned to the thickness $H_2$, which is less than the thickness $H_1$ of the first region 111. The first region 111 and the second region 112 are further arranged so that the regions are lined up in alternating fashion in a plane along the direction intersecting the fiber direction.

According to the method for manufacturing the reinforced substrate 100 configured in this manner, because the second region 112 of the reinforced substrate 100 is fashioned to the thickness $H_2$, which is less than the thickness $H_1$ of the first region 111, a recess 100a that does not include the reinforcing fibers 110 is formed in the second region 112 so as to overlap in the thickness direction. During forming of the composite material 10, the recess 100a of the reinforced substrate 100 is filled with the resin 200 in a step for impregnating the substrate with the resin 200. With the molded composite material 10 as viewed in a cross section intersecting the fiber direction of the reinforcing fibers 110, a portion having a high volumetric content of the reinforcing fibers 110 and a portion having a low volumetric content of the reinforcing fibers 110 (including a volumetric content of zero) are formed in the thickness direction of the second region 112. The portion having a low volumetric content of the reinforcing fibers 110 has a volumetric content of the resin 200 that increases in relative fashion with respect to the portion having a high volumetric content of the reinforcing fibers 110. In the portion having a high volumetric content of the resin 200, the percentage by which the composite material shrinks together with the shrinkage of the resin 200 is greater than in the portion having a low volumetric content of the resin 200. As a result, it is possible to produce a reaction force in the opposite direction to the warping force of the composite material 10 caused by the shrinkage of the resin 200. Warping produced in the composite material 10 can thereby be minimized.

In the process of arranging the reinforcing fibers 110, the large tow 113 in which a plurality of the reinforcing fibers 110 are bundled is arranged in the first region 111, and the regular tow 114 in which fewer reinforcing fibers 110 than the large tow 113 have been bundled together is arranged in the second region 112. Using the large tow 113 for the reinforcing fibers 110 improves productivity to a greater extent than when only the regular tow 114 is used and makes it possible to reduce the manufacturing cost. Also, arranging the large tow 113 in the first region 111 and arranging the regular tow 114 in the second region 112 makes it possible for the thickness $H_2$ of the second region 112 to be formed so as to be less than the thickness $H_1$ of the first region 111. Warping produced in the composite material 10 can thereby be minimized.

When the first region 111 and the second region 112 are arranged so that surfaces 111s, 112s that constitute one of surfaces orthogonal to the thickness direction of the first region 111 and the second region 112 lie in the same plane. Accordingly, a reaction force can be produced in the opposite direction to the warping force that causes warping to occur in the composite material 10. Warping produced in the composite material 10 can thereby be reliably minimized.

The auxiliary fibers 120 are laminated on the reinforcing fibers 110 so as to follow a direction intersecting the fiber direction, and at least a portion of the reinforcing fibers 110 are joined to and held by the auxiliary fibers 120. Variation in the reinforcing fibers 110 is thereby suppressed in the molding of the composite material 10 in which the reinforced substrate 100 is used, and the first region 111 and second region 112 of the reinforced substrate 100 can be reliably preserved. As a result, warping produced in the composite material 10 can be reliably minimized.

The reinforcing fibers 110 and the auxiliary fibers 120 are stitched and joined together by the stitching yarn 130. The first region 111 and the second region 112 of the reinforced substrate 100 can thereby be more reliably preserved.

The arrangement of the auxiliary fibers 120 and the positions in which the auxiliary fibers are stitched by the stitching yarn 130 are controlled on the basis of the arrangement of the reinforcing fibers 110 in the first region 111 and the second region 112. The mutually intersecting reinforcing fibers 110 and auxiliary fibers 120 can thereby be reliably stitched together by the stitching yarn 130. As a result, the first region 111 and the second region 112 of the reinforced substrate 100 can be reliably preserved.

EXAMPLES

Effects of the present invention are described below using examples and a comparative example. However, the technical scope of the present invention is not limited solely to the following examples.

Figure 14A:
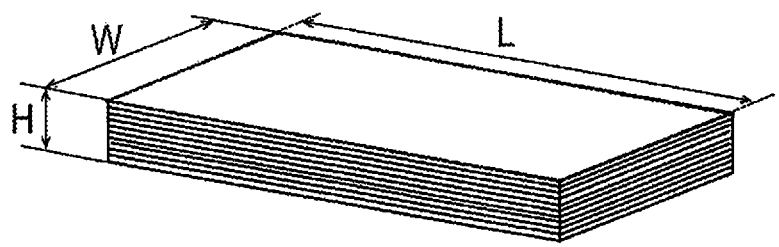
FIG. 14A is a schematic view showing the composite material before warping has occurred.
Figure 14B:
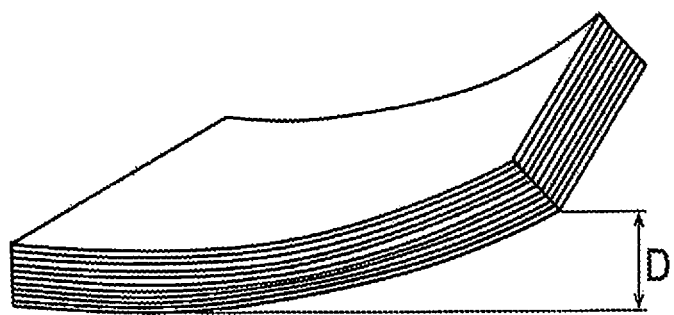
FIG. 14B is a schematic view showing the composite material after warping has occurred.

A composite material obtained by laminating a plurality of reinforced substrates to form a laminate and impregnating the laminate with resin was molded, and measurements were taken of a degree of deformation D due to warping of the composite material that was produced when the resin 200 was cured, as shown in FIG. 14A. The degree of deformation D due to warping is the relative degree of deformation between one end of the composite material and the other end, as shown in FIG. 14B.

Carbon fiber was used for the reinforcing fibers 110, and glass fiber was used for the auxiliary fibers 120. Epoxy resin was used as the resin 200. Referring to FIG. 14A, the pre-warping composite material had a length (L) of 260 (mm), a width (W) of 220 (mm), and a thickness of (H) 2 (mm).

In the example, a laminate 140 is used in which the reinforced substrates 100, 101, 102 are laminated asymmetrically at +45°/0°/−45°, as shown in FIG. 10.

The ratio of the first region 11 of the composite material 10 with respect to a region representing a total of the first region 11 and the second region 12 is expressed by the following formula, in which $V_1$ is a volume of the first region 11 of the composite material 10, and $V_2$ is a volume of the second region 12 of the composite material 10.

$$\text{Ratio (\%) of first region} = V_1/(V_1+V_2) \times 100 \qquad \text{Formula 1}$$

Example 1

The ratio of the first region 111 with respect to the region representing the total of the first region 111 and the second region 112 was 70%.

Example 2

The ratio of the first region 111 with respect to the region representing the total of the first region 111 and the second region 112 was 30%.

Comparative Example

The ratio of the first region 111 with respect to all reinforcing fibers 110 representing a total of the first region 111 and the second region 112 was 0%. In other words, the reinforcing fibers 110 were configured only from a regular tow 114.

Shrinkage Percentage of Composite Material

It was learned that when the percentage by which the resin 200 shrunk during curing was 4% and the volumetric content of the reinforcing fibers 110 in the fiber layer (see FIG. 13) was 50%, the composite material in the fiber layer theoretically shrunk a maximum of about 2%. By contrast, it was learned that the percentage by which the composite material shrunk in the reaction-force layer varied depending on the ratio of the first region 111 with respect to the region representing a total of the first region 111 and the second region 112.

Figure 15:
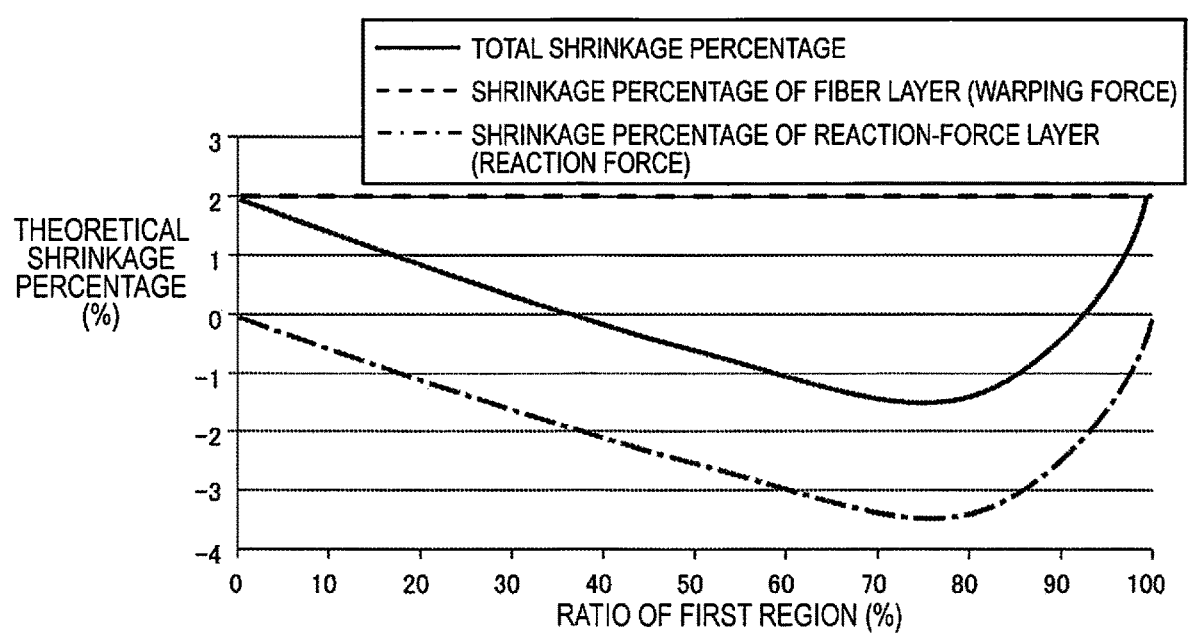
FIG. 15 is a graph showing a shrinkage percentage of the composite material (vertical axis) with respect to a ratio of a first region (horizontal axis).

FIG. 15 is a graph in which the horizontal axis shows the ratio of the first region 111 with respect to the region representing a total of the first region 111 and the second region 112, and the vertical axis shows the theoretical shrinkage percentage of the composite material. When the ratio of the first region 111 was from 0% to around 75%, an absolute value of the shrinkage percentage (reaction force) of the reaction-force layer increased as the ratio of the first region 111 increased. From about 35%, the absolute value of the shrinkage percentage (reaction force) of the reaction-force layer increased more greatly than the absolute value of the shrinkage percentage (warping force) of the fiber layer. At around 75%, the absolute value of the shrinkage percentage (reaction force) of the reaction-force layer reached a maximum. At 75% or higher, the shrinkage percentage decreased because the ratio of the resin 200 in the reaction-force layer decreased even when the ratio of the first region 111 increased. Furthermore, at 100%, the reaction force was 0 because there was no longer any difference in the volumetric content of the reinforcing fibers 110 in the reaction-force layer.

When the ratio of the first region 111 was from 0% to around 75%, the total shrinkage percentage, which represents the total of the shrinkage percentage (warping force) in the fiber layer and the shrinkage percentage (reaction force) in the reaction-force layer, decreased as the ratio of the first region 111 increased. The total shrinkage percentage was zero near 35% and 92%. The total shrinkage percentage was a minimum value at around 75%.

In view of the above, it was possible to confirm that warping of the composite material 10 can be minimized by using the reinforced substrate 100 provided with the first region 111 and the second region 112. Moreover, it was learned that the ratio of the first region 111 with respect to the region representing a total of the first region 111 and the second region 112 is preferably 35 to 92%. A ratio of 35% or 92%, at which the total shrinkage percentage approaches 0%, is more preferable. It was learned that 92% is even more preferable from the standpoint of increasing the ratio of the large tow 113 to the extent possible to reduce cost.

TABLE 1

|  | Example 1 | Example 2 | Comparative example |
|---|---|---|---|
| Fiber count of fiber bundles | 50,000 (large tow)/ 24,000 (regular tow) | 24,000 (regular tow) | |
| Basis weight (g/m²) | 300 | | |
| Lamination configuration | +45°/0°/−45° | | |
| Ratio (%) of first region | 70 | 30 | 0 |
| Shrinkage percentage of fiber layer (%) | 2 | | |

TABLE 1-continued

|  | Example 1 | Example 2 | Comparative example |
|---|---|---|---|
| Shrinkage percentage of reaction-force layer (%) | −3.3 | −1.7 | 0 |
| Total shrinkage percentage (%) | −1.3 | 0.3 | 2 |
| Degree of deformation D due to warping (mm) | 3.2 | 19.7 | 56.3 |

Furthermore, it was possible to confirm from the results in Table 1 that, in the composite material 10 of the present example 1 in which the reinforced substrate 100 was used, the degree of deformation D was kept to about 1/17 of the value in the comparative example. It was also possible to confirm that, in the composite material 10 of the present example 2 in which the reinforced substrate 100 was used, the degree of deformation D was kept to about 1/6 of the value in the comparative example.

The reinforced substrate for a composite material, the composite material, and the method for manufacturing the reinforced substrate for the composite material are described above by way of an embodiment, but the present invention is not limited only to the configuration described in the embodiment, and changes can be made as appropriate on the basis of the description in the claims.

For example, a mode was described in which the first region and the second region of the reinforced substrate correspond to the first region and the second region of the composite material, and the third region of the composite material includes only resin, but the present invention is not limited to the above-described embodiment as long as the volumetric content of the resin in the third region is higher than that in the second region. For example, when the composite material is molded, the reinforcing fibers included in the second region may enter the third region, allowing the third region to be formed so as to include the reinforcing fibers.

The number of large tows arranged in the first region is not limited to one, and a plurality of large tows may be aligned in continuous fashion. Similarly, the number of regular tows arranged in the second region is not limited to one, and a plurality of regular tows may be aligned in continuous fashion.

The shape of the large tow and regular tow is not limited to that in the embodiment described above.

The manner in which the reinforcing fibers and the auxiliary fibers are joined together in the method for manufacturing a reinforced substrate for a composite material is not limited to stitching with a stitching yarn. It is also possible to use, e.g., bonding or another known joining method. When a joining method other than stitching is used, the reinforced substrate for a composite material and the composite material are not limited to a configuration provided with stitching yarn.

The method for molding the composite material is not limited to the RTM method. For example, autoclave molding or another known molding method can be selected as appropriate.

The invention claimed is:

1. A reinforced substrate used for molding a composite material, the reinforced substrate comprising:
   a first region including reinforcing fibers extending in a fiber direction that is aligned in a single direction;

a second region including the reinforcing fibers aligned in the same direction as the fiber direction and being thinner than the first region;
auxiliary fibers laminated on the reinforcing fibers so as to extend in a direction that intersects the fiber direction, and joined to at least a portion of the reinforcing fibers to hold the reinforcing fibers; and
a stitching yarn that stitches and joins the laminated auxiliary and reinforcing fibers together;
the first region and the second region being lined up in alternating fashion in a plane along a direction intersecting the fiber direction, the reinforcing fibers of the first region have a first tow, and the reinforcing fibers of the second region have a second tow, the first tow having a fiber count of 40,000 or more and the second tow having a fiber count of 24,000 or less.

2. The reinforced substrate according to claim 1, wherein the second tow of the second region has a fiber count of 12,000 to 24,000.

3. The reinforced substrate according to claim 1, wherein the first region and the second region are formed so that one surface of each of the first and second regions is orthogonal to a thickness direction and both surfaces lie in the same plane.

4. The reinforced substrate according to claim 1, wherein the auxiliary fibers have a lower modulus of elasticity than do the reinforcing fibers.

5. The reinforced substrate according to claim 1, wherein the auxiliary fibers have a higher tensile elongation at break than do the reinforcing fibers.

* * * * *